(12) United States Patent
Mueller (10) Patent No.: US 7,875,103 B2
(45) Date of Patent: Jan. 25, 2011

(54) SUB-MICRON VISCOUS IMPINGEMENT PARTICLE COLLECTION AND HYDRAULIC REMOVAL SYSTEM

(75) Inventor: Fred Mueller, Houston, TX (US)

(73) Assignee: Mueller Environmental Designs, Inc., Houston, TX (US)

( * ) Notice: Subject to any disclaimer, the term of this patent is extended or adjusted under 35 U.S.C. 154(b) by 879 days.

(21) Appl. No.: 11/740,073

(22) Filed: Apr. 25, 2007

(65) Prior Publication Data

US 2007/0251383 A1 Nov. 1, 2007

Related U.S. Application Data

(60) Provisional application No. 60/853,321, filed on Apr. 26, 2006.

(51) Int. Cl.
*B01D 47/00* (2006.01)
(52) U.S. Cl. ............... 95/196; 96/240; 96/266; 96/271; 96/322; 96/355; 95/205; 95/219; 55/356; 55/357
(58) Field of Classification Search .......... 95/196, 95/205, 210–219; 96/240, 301, 303, 311, 96/306–310, 314–319, 366, 355, 266, 271, 96/322; 55/356, 357
See application file for complete search history.

(56) References Cited

U.S. PATENT DOCUMENTS

| | | | | |
|---|---|---|---|---|
| 1,493,579 | A | * | 5/1924 | Walter ............ 95/200 |
| 2,681,736 | A | * | 6/1954 | Voorheis .......... 210/341 |
| 3,030,421 | A | | 4/1962 | Reuter |
| 3,154,485 | A | * | 10/1964 | Liddell .......... 210/128 |
| 3,327,455 | A | * | 6/1967 | Wertheimer ........ 96/2 |
| 3,395,510 | A | | 8/1968 | Barnes |
| 3,651,619 | A | | 3/1972 | Miura |
| 3,733,788 | A | * | 5/1973 | Crowley ........... 96/240 |

(Continued)

FOREIGN PATENT DOCUMENTS

DE 3624461 A * 1/1988

(Continued)

OTHER PUBLICATIONS

MED Model KLS—Helical Coil Separator, Mueller Environmental Designs, Inc. Feb. 2004.*

(Continued)

*Primary Examiner*—Duane Smith
*Assistant Examiner*—Ives Wu
(74) *Attorney, Agent, or Firm*—Conley Rose, P.C.

(57) ABSTRACT

Systems and related methods for separating liquids and particulate from a flowing gas stream include a separation vessel containing a liquid injector, an impingement separator or a helical impingement separator, and a waste liquid recovery tank. Separated liquid and particulate collect in a sump, flow into a recovery tank, and may be filtered in a side stream duplex filter circuit for return into the recovery tank and re-injection into the separation vessel. The helical separator element has outwardly extending helical fins that form helical gas channels. The interior of the channels forms a rounded radius and opposing vertical edges of the channels include chamfers. The lower end of the helical separator element forms a concave, generally conical surface. The helical fins form a first impingement separator and the chamfers form a second vane-type impingement separator, such that particulate and liquids may be removed from the gas stream at varying flow rates and liquid/particulate densities.

21 Claims, 3 Drawing Sheets

U.S. PATENT DOCUMENTS

| | | | |
|---|---|---|---|
| 3,784,091 A | | 1/1974 | Hiller |
| 3,868,236 A | | 2/1975 | Meier |
| 3,884,660 A | * | 5/1975 | Perry et al. .................... 55/396 |
| 3,947,276 A | | 3/1976 | Siclari |
| 3,969,096 A | | 7/1976 | Ricahrd |
| 3,979,192 A | | 9/1976 | Hobbs |
| 4,044,055 A | | 8/1977 | Katz |
| 4,047,891 A | * | 9/1977 | Schuetz ....................... 436/183 |
| 4,078,101 A | | 3/1978 | Cole |
| 4,111,809 A | | 9/1978 | Pichon |
| 4,115,084 A | | 9/1978 | Coggins |
| 4,157,250 A | * | 6/1979 | Regehr et al. .................. 96/299 |
| 4,180,391 A | * | 12/1979 | Perry et al. .................... 55/324 |
| 4,280,825 A | * | 7/1981 | Marjollet et al. ................ 55/347 |
| 4,308,039 A | * | 12/1981 | Djololian et al. .............. 96/316 |
| 4,350,510 A | | 9/1982 | Hamada |
| 4,370,236 A | | 1/1983 | Ferguson |
| 4,572,787 A | | 2/1986 | Robinson |
| 4,576,618 A | | 3/1986 | Wooldridge |
| 4,579,565 A | | 4/1986 | Heath |
| 4,688,650 A | | 8/1987 | Hayatdavoudi |
| 4,834,954 A | * | 5/1989 | Dorr et al. ............. 423/243.01 |
| 4,844,721 A | | 7/1989 | Cox |
| 4,874,526 A | | 10/1989 | Grade |
| 4,904,347 A | | 2/1990 | Cros |
| 4,931,164 A | | 6/1990 | Dickakian |
| 4,938,785 A | | 7/1990 | McPherson |
| 4,948,396 A | | 8/1990 | Barnes |
| 5,127,231 A | * | 7/1992 | Larue et al. ..................... 62/633 |
| 5,262,962 A | | 11/1993 | Kindig |
| 5,308,509 A | * | 5/1994 | Bhat et al. .................. 210/770 |
| 5,500,126 A | | 3/1996 | Fries |
| 5,820,766 A | | 10/1998 | Gevertz |
| 5,893,956 A | | 4/1999 | Perry |
| 5,919,284 A | | 7/1999 | Perry |
| 5,972,061 A | | 10/1999 | Nykyforuk |
| 6,001,264 A | | 12/1999 | Suzuki |
| 6,019,818 A | * | 2/2000 | Knapp ......................... 95/187 |
| 6,153,100 A | | 11/2000 | Mitchell |
| 6,168,647 B1 | | 1/2001 | Perry, Jr. |
| 6,177,047 B1 | | 1/2001 | Kuczynski |
| 6,251,168 B1 | | 6/2001 | Birmingham |
| 6,364,940 B1 | | 4/2002 | Prueter |
| 6,402,799 B1 | | 6/2002 | Kokubo |
| 6,494,258 B1 | | 12/2002 | Weingarten |
| 6,599,340 B2 | | 7/2003 | Conrad |
| 6,673,133 B2 | | 1/2004 | Sechrist |
| 6,692,225 B2 | | 2/2004 | Lin |
| 6,800,208 B2 | | 10/2004 | Bolman |
| 6,802,881 B2 | | 10/2004 | Illingworth |
| 6,810,835 B2 | | 11/2004 | Ishiguro |
| 6,811,713 B2 | | 11/2004 | Arnaud |
| 6,821,322 B2 | | 11/2004 | Milia |
| 6,837,912 B1 | | 1/2005 | Heumann |
| 6,843,882 B2 | | 1/2005 | Janakiraman et al. |
| 6,858,067 B2 | | 2/2005 | Burns |
| 6,860,921 B2 | | 3/2005 | Hopper |
| 6,866,048 B2 | | 3/2005 | Mattox |
| 6,902,593 B2 | * | 6/2005 | Miller et al. .................. 55/338 |
| 6,905,605 B2 | | 6/2005 | Klomp |
| 6,919,017 B2 | | 7/2005 | Annesley |
| 6,935,513 B2 | | 8/2005 | Simon |
| 6,955,704 B1 | | 10/2005 | Strahan |
| 6,962,199 B1 | | 11/2005 | Wtjeenk Willink |
| 6,974,542 B2 | | 12/2005 | von Phul |
| 6,984,257 B2 | | 1/2006 | Heath |
| 6,986,358 B2 | | 1/2006 | Mattox |
| 7,001,448 B1 | * | 2/2006 | West ........................... 95/271 |
| 7,004,998 B2 | | 2/2006 | Scherrer |
| 7,014,757 B2 | | 3/2006 | Rhodes |
| 7,018,437 B2 | | 3/2006 | Roth |
| 7,419,603 B2 | * | 9/2008 | Cho .......................... 210/712 |
| 7,516,990 B2 | * | 4/2009 | Jamison et al. ............. 285/382 |
| 7,575,625 B2 | * | 8/2009 | Seida et al. .................... 95/70 |
| 2006/0091077 A1 | * | 5/2006 | Haas et al. .................. 210/641 |
| 2009/0139938 A1 | * | 6/2009 | Larnholm et al. ........... 210/788 |

OTHER PUBLICATIONS

"KLS 1A System" 1999 (C2).*
MED Model KLS—Helical Coil Separator, Mueller Environmental Designs, Inc. Feb. 2004.*
KLS 1A System (1999) provided by applicant.*
Mueller Environmental Designs Inc., Fundamentals of Gas Solids Liquids Separation (Feb. 2004) (16 pages).
Mueller Environmental Designs Inc., MED Model KLS Helical Coil Separator (Feb. 2004) (8 pages).
Gas Pipeline Cleanliness—A Unique Approach to Contamination Removal, Pipeline & Gas Journal (Jun. 2007) (2 pages).
New Process Helps Prepare for Winter, Mainline (Oct. 2003) (1 page).
Mueller Environmental Designs Inc., KLS 1 System (1999) (1 page) ("C1").
Mueller Environmental Designs Inc., KLS 1A System (1999) (1 page) ("C2").
Mueller Environmental Designs Inc., KLS 1B System (1999) (1 page) ("C3").
Mueller Environmental Designs Inc., KLS 2 System (2004) (1 page) ("C4").
Mueller Environmental Designs Inc., KLS 2A System (2004) (1 page) ("C5").
Mueller Environmental Designs Inc., KLS 3 System (2005) (1 page) ("C6").

* cited by examiner

SUB-MICRON VISCOUS IMPINGEMENT PARTICLE COLLECTION AND HYDRAULIC REMOVAL SYSTEM

CROSS-REFERENCE TO RELATED APPLICATIONS

The present application claims priority to U.S. Provisional Patent Application 60/853,321, filed Apr. 26, 2006.

FIELD OF THE INVENTION

The present invention relates in general to systems and methods for removing liquids and particulate from flowing gas streams. More particularly, the invention relates to systems and methods for removing liquids and particulate from flowing gas streams by encapsulation of the particulate and impingement separation of the liquid and particulate.

BACKGROUND

Flowing gas streams often contain particulate material that must be removed from the stream. The particulate material may be an undesirable contaminant in the gas stream. Alternatively, the gas stream may contain a desirable particulate material, for example, in a process for manufacturing the particulate. Similarly, flowing gas streams may contain liquids, either desirable or undesirable, that must be removed from the gas stream.

There presently exist several systems and methods for removing particulate material and/or liquids from gas streams, including inertial, viscous, diffusion, and electrostatic separation systems and methods. Further background regarding available systems and methods may be found in the applicant's Technical Paper *Fundamentals of Gas Solids/Liquids Separation*, Gas Machinery Research Council, Dallas, Tex. (2004), hereby incorporated by reference, and in the applicant's publication, *Principles of Air Filtration*, available at <http:www.muellerenvironmental.com>.

An example of an application that requires the removal of liquid and particulate from a flowing gas stream occurs in the transmission of natural gas. Natural gas is often introduced into and transmitted through a pipeline system with entrained liquids and particulate. Additional particulate often enters the natural gas pipeline as a result of cleaning the pipeline, for example, during periodic inspection of the pipeline wall thickness. This cleaning and inspection has recently become more important with federal regulations that mandate more frequent inspections. Cleaning the interior of a natural gas pipeline removes debris from the pipeline wall, which then enters the natural gas stream. The particulate and liquid must be removed before the gas stream enters the gas compressors, where it could otherwise damage or degrade the efficiency of the compressors.

Other applications that require the removal of liquids and particulate from flowing gas streams include the filtering of the inlet gas flow entering gas turbines or reciprocating engine-drive compressors, separating sand from water (e.g., separating produced water from "frac" sand in oil and gas wells), and removing large volumes of liquids that have been used to plug or "kill" natural gas wells.

Traditional filter separators used in these and other applications, for example, two-stage filter and vane separators, are generally capable of removing only 10% by weight of liquid before the liquids begin to pass through the filter separator and into the compressor or other machinery. Centrifugal compressors may pass through these liquids within a gas stream, but reciprocating compressors may be seriously damaged by the presence of even small amounts of liquid. Furthermore, changing or cleaning the filter elements in these traditional systems is often complex and labor-intensive. Often, the flowing gas stream must be stopped or rerouted to bypass the separation device or other machinery. Then, the internal system pressure must be reduced to atmospheric pressure. Personnel using hazardous material safeguards then enter the system, manually replace filters clogged with large quantities or very viscous materials, and manually clean the interior spaces of the filter separator. After cleaning, the filter separator must then be closed, the bypass removed, and the system re-pressurized or brought back online. During the entire cleaning process, machinery connected to these systems is typically shut down. Further, the material thus removed from the system may also be considered hazardous and require special precautions for disposal.

Accordingly, there exists a need for new systems and methods for removing particulate and liquids from flowing gas streams wherein the new systems and methods are capable of effective operation at varying gas flow rates and potentially high liquid-to-gas weight ratios. Preferably, such systems should also provide easier maintenance, require less frequent cleaning, maintain operational status during cleaning, and produce less potentially hazardous waste products.

SUMMARY

In brief summary, the present invention includes systems and methods for separating and removing liquid and particulate from flowing gas streams. A flowing gas stream enters a separator vessel hydraulically connected to a waste liquid recovery tank and a duplex-filtered side stream. A liquid may be injected into the separator upstream from the liquid separator to encapsulate particulate before entering the separator. Liquid may also be injected into the separator to further facilitate encapsulation.

Liquids and particulate separated from the gas stream drop into a gravity-fed waste liquid sump. The sump includes maximum and minimum liquid level switches which control a valve for draining the sump into a waste liquid recovery tank. The tank includes a duplex-filtered side stream circuit. The side stream circuit reintroduces filtered liquid back into the tank so that the filtered liquid may be re-injected in a continuous loop. The side stream circuit may also include a three-way valve so that filter elements in one of the duplex filters may be cleaned or replaced during active operation of the system.

The separator may be a vertically oriented helical separator. Coaxial inner and outer tubes provide a flow path for the gas stream and liquid path open to the sump. The helical separator may be positioned within and near the top of the outer tube, and includes a plurality of adjacent separator fins extending outwardly to form a plurality of helical channels. Chamfers may be provided on a distal vertical edge of the fins and a generally rounded radius may be provided between adjacent fins. Further, the lower end of the separator may also form a generally conical surface. Thus, a flowing gas stream may be directed through the helical channels which facilitate impingement separation.

As discussed in more detail below, in comparison to most previous separator designs, the particle collection and hydraulic removal system of the present invention requires simpler and less frequent maintenance and cleaning, with fewer operational interruptions, and produces less potentially hazardous waste products.

As is also discussed below, the particle collection and hydraulic removal system of the present invention is also highly effective at removing a large volumes of liquid and particulate, and is adaptable to a wide variety of gas stream flow conditions and particulate/liquid loading densities.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Particle Collection and Hydraulic Removal System and Method

Figure 1:
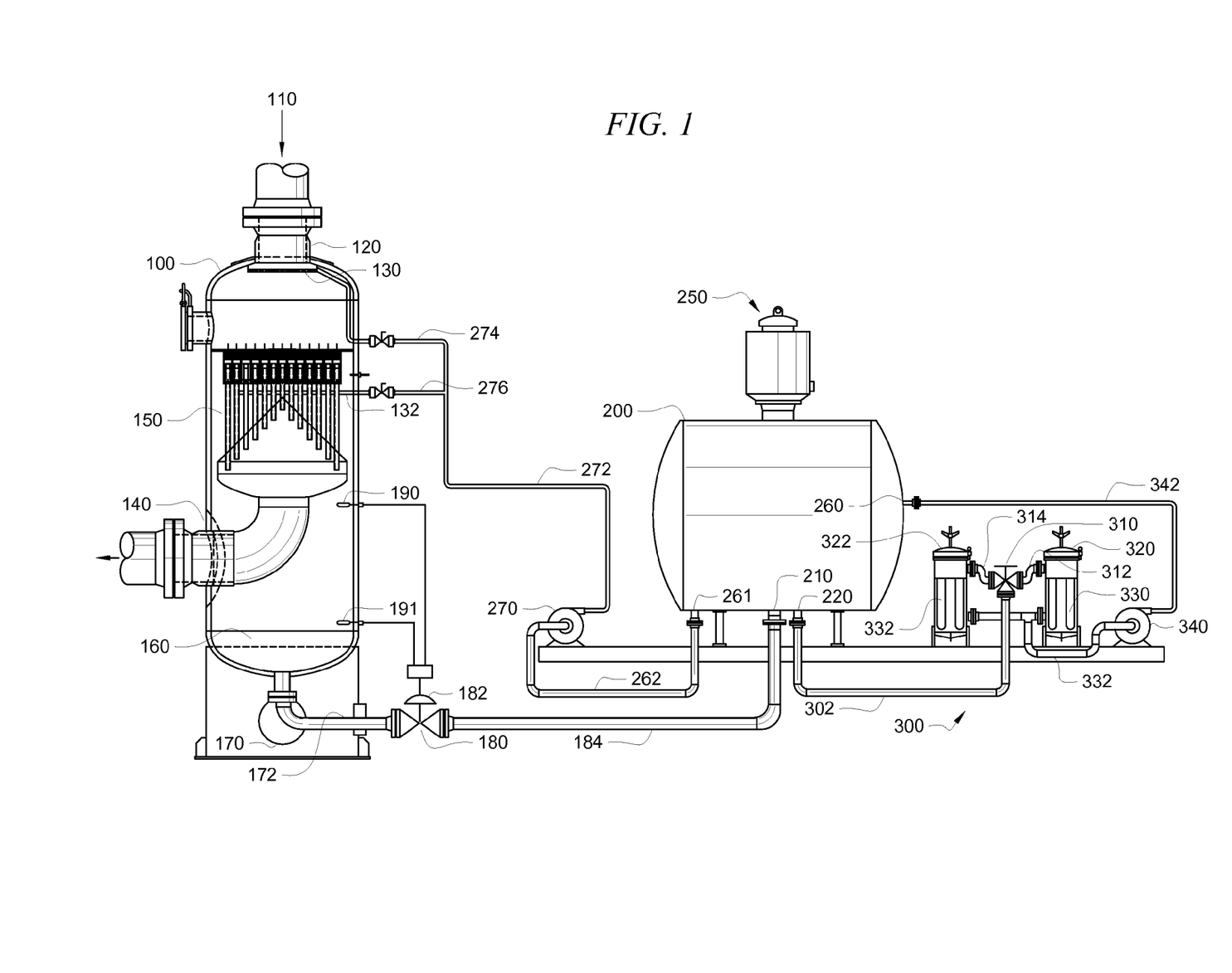
FIG. 1 is a cross section side view of an embodiment of the particle collection and hydraulic removal system of the present invention arranged for separating particulate and liquids from a flowing gas stream.

FIG. 1 illustrates an embodiment of a particle collection and hydraulic removal system adapted for separating solid particulate and liquids from flowing gas streams. In general, the system includes a separator vessel 100 hydraulically connected to a waste liquid recovery tank 200 and a duplex-filtered side stream 300.

A flowing gas stream 110 may contain particulate and/or liquid that must be removed. By way of example, gas stream 110 may be a stream of pressurized natural gas flowing through a natural gas distribution system. For such an application, the particle collection and hydraulic removal system is typically located in or near a natural gas compressor station immediately upstream from the gas compressor or compressors, and downstream from any existing pig catcher. In this manner, solids and liquids may be removed from the gas stream 110 before it enters the gas compressors, where it would otherwise damage or degrade the efficiency of the compressors. In such an application, the particle collection and hydraulic removal system may include a separator vessel 100 for each natural gas compressor, and a waste liquid recovery tank 200 for every two separator vessels 100. Those skilled in the art would recognize that, for this particular application or other similar applications, different combinations of separator vessels 100 and recovery tanks 200 may be employed with equal success depending on the various requirements of the particular application.

In FIG. 1, separator vessel 100 is depicted as a vertically-oblong cylindrical tank, but those skilled in the art would recognize that vessel 100 may be any closed container with a height sufficient to enclose the internal components described more fully below. Vessel 100 includes a gas inlet 120 where the flowing gas stream 110 enters the vessel 100. Vessel 100 also includes a gas outlet 140 where the gas stream 110 exits the vessel after separation of the liquids and particulate.

After gas stream 110 enters inlet 120, a liquid may be injected into the gas stream by injector 130, for example, by a plurality of holes or nozzles (not shown) in conduit 274. The injected liquid encapsulates solid particles within the gas stream 110. Mineral oil, glycol, methanol, and similar liquids may be used as the injection liquid, depending on the particular requirements of the application. For example, the injection liquid may be Crystal Plus 70T light viscosity white mineral oil available from STE Oil Company, Inc., of San Marcos, Tex.

Vessel 100 also includes a mechanical separator. FIG. 1 depicts separator 150 located downstream from injector 130 and upstream from gas outlet 140. Separator 150 may be any type of gas-liquid separator, for example, a vane impingement separator or a centrifugal separator. In a preferred embodiment, separator 150 may be a helical separator 400 as more fully described in FIGS. 2-6 and the accompanying text. Separator 150 separates solids, liquids, and solids encapsulated within liquids from the gas stream 110.

A second stage of liquid injectors, for example injectors 132, may be employed downstream from injectors 130 to more fully encapsulate particulate in the gas stream 110. In FIG. 1, injectors 132 inject liquid directly into the separator 150 through conduit 276.

Solids, liquids, and solids encapsulated within liquids separated from the gas stream 110 drop out from the gas stream 110 by gravity and fall into sump 160 located at the bottom of vessel 100. During operation, the sump 160 fills with waste liquid until the waste liquid level activates switch 190. Switch 190 then sends a signal to actuator 182, which opens sump valve 180. Gravity and the internal pressure within vessel 100 may then drain the waste liquid from sump 160 through conduits 172 and 184, until the waste liquid level falls below the level of switch 191. Switch 191 then sends another signal to actuator 182, which closes sump valve 180. Alternatively, if needed for low gas stream pressures or for other applications, a sump pump 170 may be used to pump waste liquid from sump 160. In this manner, a level of waste liquid is always maintained in the sump to prevent the escape of any gasses from gas stream 110 through the sump. Thus, the portions of the particle collection and hydraulic removal system downstream from the sump 160 need not be maintained at high internal pressures.

Waste liquid removed from sump 160 then travels through conduits 172 and 184, through outlet 210, and into to recovery tank 200. Recovery tank 200 collects waste liquid for removal, or for filtering and re-injection. In order to permit re-injection of waste liquid, a side stream of waste liquid is drained from recovery tank 200 at outlet 220 during operation. The waste liquid travels through conduit 302 and into a side stream filtration system, preferably, a duplex filtration system.

The duplex filtration embodiment depicted in FIG. 1 includes a three-way valve 310 which selectively directs waste liquid from recovery tank 200 into one of filter vessels 320 and 322. Vessels 320 and 322 preferably include bag-type filter elements or other replaceable filter means that can be easily removed and discarded or cleaned. In the preferred embodiment, pump 340 draws waste liquid through a plurality of filter elements (filters 330 or filters 332) in the selected filter vessel (either vessel 320 or vessel 322, respectively). Pump 340 extracts filtered liquid from the selected filter vessel through conduit 332, and then pumps the filtered liquid through conduit 342 and into recovery tank 200 at inlet 260. Pump 340 preferably maintains a flow volume through side stream 300 which is greater than the flow volume into the recovery tank 200, so that the liquid in recovery tank 200 remains clean and there is no need for additional mechanisms to segregate clean liquid from waste liquid. In a preferred embodiment, pump 340 maintains a flow rate of filtered liquid of 5-6 times the flow rate of waste liquid entering sump 160.

The varying flow rates entering the recovery tank 200 at inlets 210 and 260, and exiting the recovery tank 200 at outlets 220 and 261 may cause a fluctuation of the liquid level in recovery tank 200. Thus, recovery tank 200 preferably also includes a filter vent 250 to maintain near atmospheric pressure during liquid level fluctuations.

After a period of operation, the filters 330 in the currently selected vessel (filters 330 in vessel 320, or filters 332 in vessel 322) will require replacing, which is typically indicated by a higher than expected pressure drop. When this occurs, the three-way valve 310 may be switched to select the other of vessels 320 and 322. The de-selected vessel may then be opened to simply replace or clean filters 330. Here, the de-selected vessel may be opened to the atmosphere for replacing the filters without expelling or leaking waste liquid, or exposing personnel to hazardous gasses. Thus, unlike prior systems, the present particle collection and hydraulic removal system need not be bypassed or taken off line for periodic filter replacement, and personnel need not take extraordinary environmental precautions to guard against exposure to potentially harmful substances.

Lastly, filtered liquid (e.g., mineral oil) is drawn out from recovery tank 200 at outlet 261 and through conduit 262 by pump 270. Pump 270 also delivers filtered liquid through conduits 272, 274, and 276 into vessel 100 for re-injection into the gas stream 110. In this manner, waste liquid is removed from gas stream 110, filtered, and returned for reuse in a substantially continuous closed-circuit.

Helical Separator Element

Figure 2:
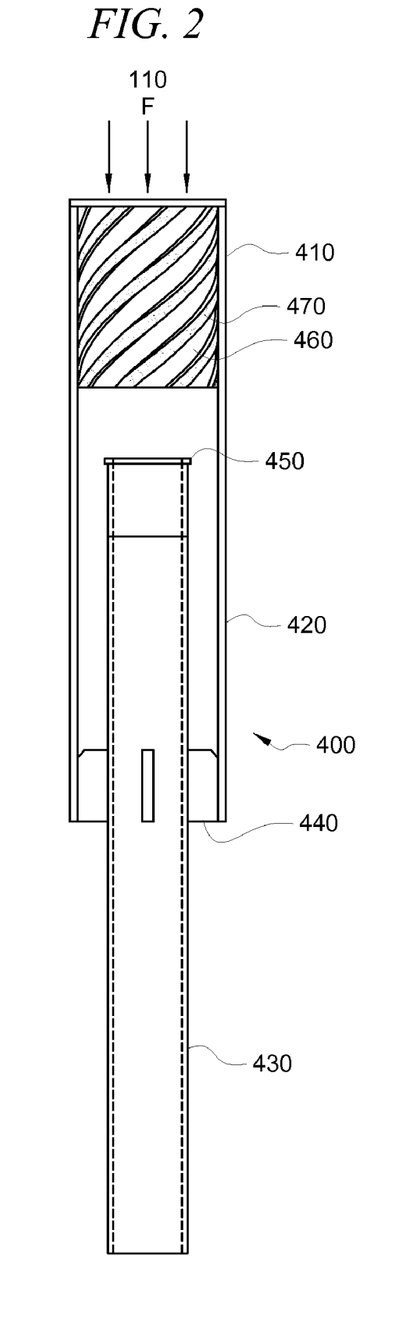
FIG. 2 is a cut-away side view of an embodiment of a helical separator of the present invention.

The mechanical separator 150 illustrated in FIG. 1 is preferably a plurality of tightly-spaced and vertically oriented helical separators, such as the helical separator 400 depicted in FIG. 2. In FIG. 2, helical separator 400 includes helical element 410 secured within and at the top of a generally cylindrical outer tube 420. Generally cylindrical inner tube 430 has a smaller outer diameter than inner diameter of outer tube 420, and is vertically spaced a short distance below helical element 410. The lower portion of inner tube 430 is retained and centralized within outer tube 420 in part by vertically oriented fins 440.

In FIG. 2, the flow direction of gas stream 110 (also depicted in FIG. 1) is generally illustrated with arrow F. The gas stream 110 is directed into the top of helical element 410, which is surrounded by outer tube 420. A helical gas flow path is provided by channels 460 and fins 470 (better illustrated in FIG. 4) which wind clockwise from the top to the bottom of helical element 410.

As the gas stream 110 flows downwardly through channels 460 and between fins 470, the gas stream 110 impinges on the walls of fins 470, and begins to rotate clockwise. Particulate and liquids carried within the gas stream 110 have greater density than the gas stream 110, and a corresponding higher kinetic energy. Thus, particulate carried within the gas stream 110 impinges on the walls of fins 470 and becomes further encapsulated within the liquid. Liquid vapor and smaller liquid droplets in the gas stream 110 impinge on the walls of fins 470 and coalesce to form larger liquid droplets and liquid streams or sheet flow on the walls of fins 470, particularly on the lowermost walls of fins 470.

Similarly, when the gas stream 110 begins to rotate clockwise in channels 460 and between fins 470, the increased angular velocity of the gas stream 110 creates centripetal forces. The centripetal forces have a greater effect on the particulate and liquids in the gas stream 110, thereby causing coalescence and encapsulation on the inside wall of outer tube 420. Thus, coalescing liquid droplets, liquid streams, and encapsulated particulate form larger liquid streams flowing in sheet flow downwardly along the walls of fins 470 and along the inside wall of outer tube 420. The sheet flow traveling downwardly along the inside wall of outer tube 420 continues flowing downwardly to the bottom of outer tube 420, where it drops off into the sump 160 (depicted in FIG. 1). Any sheet flow remaining on the walls of fins 470 exits the bottom of helical element 410 and also preferably drops off into the sump 160.

As discussed in more detail below, a preferred configuration of helical element 410 is about 4 inches in diameter and 5 inches high, with channels 460 and fins 470 turning a total of about 180 degrees. With typical gas flow rates, this configuration generates centripetal acceleration forces of about 1,300 G's with a Reynolds number in the range $10^4$ to $10^5$. Smaller diameter helical elements 410 (e.g., 2 inches) have been found to create unnecessarily high centripetal forces (e.g., up to 5,000 or 6,000 G's) and thereby prevent desirable coalescence and eventual sheet flow of liquids.

Figure 3:
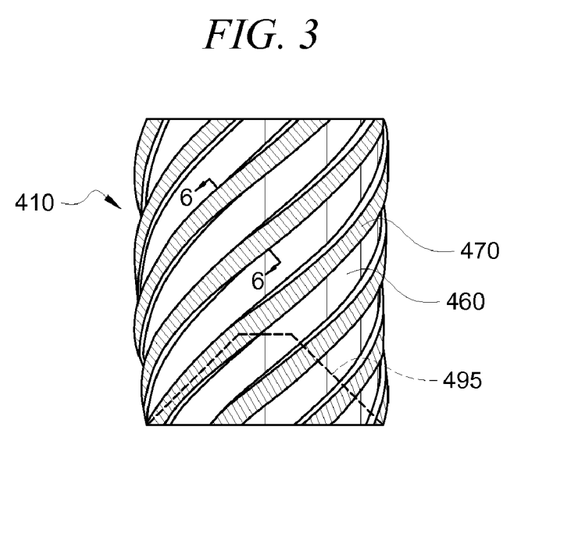
FIG. 3 is a side view of a helical element of the embodiment depicted in FIG. 2.
Figure 6:
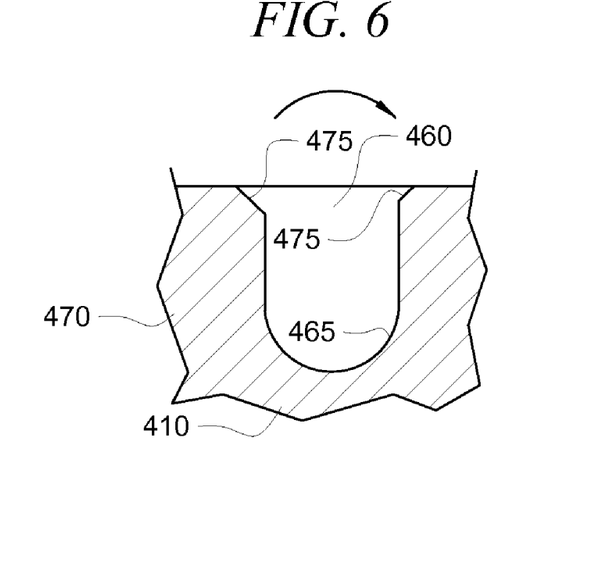
FIG. 6 is a partial cross section angled view along line 6-6 of the embodiment depicted in FIG. 3.

As indicated by the flow arrow in FIG. 6, the gas stream 110 flowing through helical element 410 also forms a secondary vortex rotating clockwise when viewed generally from the top along line 6-6 (FIG. 3). If not counteracted, these secondary vortices may prevent impingement and coalescence, and eventually exit the bottom of helical element 410 and thereafter tend to undesirably re-entrain liquids into the gas stream 110, particularly liquids exiting the bottom of helical element 410 along the surface of fins 470 and channels 460.

Figure 4:
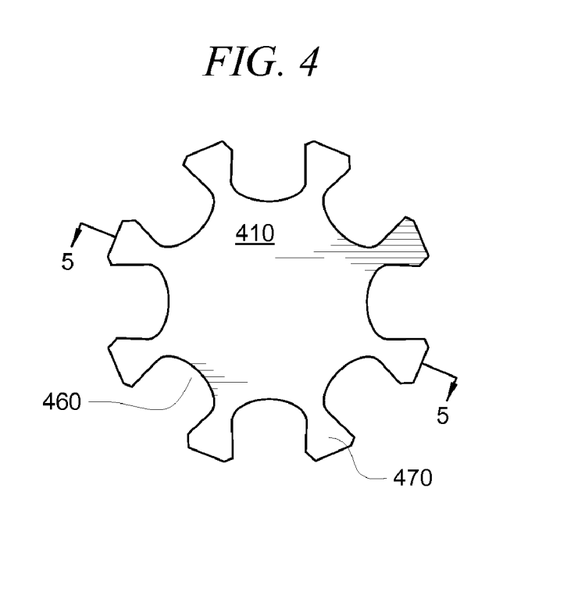
FIG. 4 is a cross section top view of the embodiment depicted in FIG. 3.
Figure 5:
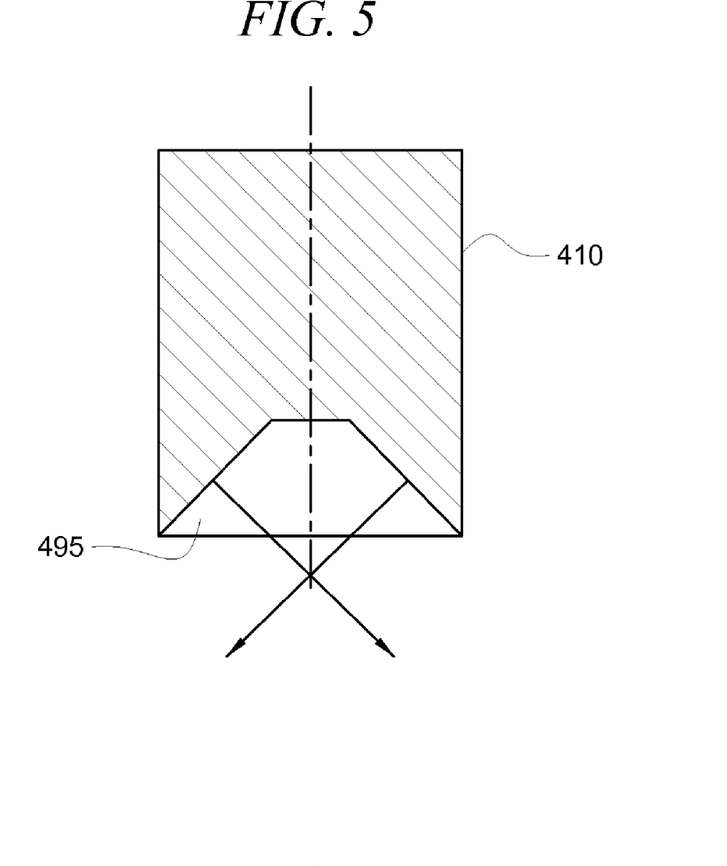
FIG. 5 is a cross section side view along line 5-5 of the embodiment depicted in FIG. 4.

A preferred embodiment includes several means to counteract these secondary vortices and prevent liquid re-entrainment. As shown in FIGS. 4-6, the intersection of the channels 460 and the walls of fins 470 forms a generally semi-circular, interior radius 465. The radius 465 inhibits liquid separation in the secondary vortices on what would otherwise be square corners formed at the intersection of the channels 460 and the walls of fins 470.

Additionally, relatively small chamfers 475 are formed along the vertical exterior edges of fins 470. When helical element 410 is fitted tightly within outer tube 420, the chamfers 475 form small pockets that act as additional vane-type separators oriented to remove liquids and particulate from the secondary vortices. In this manner, coalesced liquid streams are more effectively directed away from channels 460 and are trapped in a vertical pocket formed between the chamfers 475 and the inner wall of outer tube 420. The liquid streams flowing downwardly along the inner wall of outer tube 420 are also thereby less prone to re-entrainment within the gas stream 110. Surprisingly, the use of chamfers 475 has been shown to double the effective liquid removal rate over non-chamfered edges under typical conditions.

As shown in FIGS. 3 and 5, helical element 410 also includes an interior cone 495 formed at the bottom end. The surface of the cone 495 generally forms a 45 degree angle to the central axis of helical element 410. When liquid streams flowing in channels 460 and along the walls of fins 470 exit the bottom of helical element 410, the liquid streams tend to exit at a tangent to the bottom surface of helical element 410. Cone 495 acts to direct these exiting liquid streams perpendicularly to the surface of the cone and toward the interior surface of outer tube 420, as indicated by the flow arrows in FIG. 5. Inner tube 430 disrupts secondary vortices forming below helical element 410 and thereby prevent or reduce the potential for liquid re-entrainment. Vertical fins 440 also act to disrupt any remaining gas vortices within the annular space formed between outer tube 420 and inner tube 430, and thereby further prevent or reduce liquid re-entrainment.

Inner tube 430 may also include a small rim lip 450 at the top end facing the bottom of helical element 410. Vortices and gas flow within the annular space formed between outer tube 420 and inner tube 430 may cause the sheet flow liquid on the exterior of inner tube 430 to flow upward against the force of gravity. Rim lip 450 extends outwardly from the exterior of inner tube 430 to disrupt this creeping flow and prevent it from passing over the top rim of inner tube 430, where the creeping flow might otherwise be re-entrained within the gas stream 110.

Helical Separator Application Considerations

The following design considerations are provided to assist in optimizing the efficiency and effectiveness of the helical separators of the present invention in alternative particular applications.

Helical Channel Separation Efficiency

With the helical separator embodiments of the present invention, the separated particle size is dependent on particle density and surface tension, gas density and viscosity, magnitude of the gas stream velocity, and the radius of curvature provided by the helical channel flow path. The formula below may be used to determine the helical channel separation efficiency, as indicated by the smallest diameter of particulate removed at 99.95% efficiency:

$$D = 2.3216 \times 10^6 \left( \frac{\mu_G}{V(\rho_L - \rho_G)} \right)^{.5} \times (\gamma^{-.25}) \times (R^{.5}) \quad \text{[liquid particles]}$$

$$D = 2.3216 \times 10^6 \left( \frac{\mu_G}{V(\rho_S - \rho_G)} \right)^{.5} \times (R^{.5}) \quad \text{[solid particles]}$$

Where:
D=diameter of smallest particulate removed at 99.95%
$\mu_G$=gas viscosity (cP)
V=velocity of helical coil (ft./sec.)
$\rho_L$=density of liquid (lb./cu. ft.)
$\rho_S$=density of solid (lb./cu. ft.)
$\rho_G$=density of gas (lb./cu. ft.)
$\gamma$=surface tension of liquid (dynes/cm)($\gamma$=1 for solids)
R=helical coil shell radius (ft.)

Helical Channel Gas Flow Capacity

The helical separator embodiments of the present invention will typically remove 99.95% of all solid and liquid particles 6 microns and larger at all gas flow rates. Particles less than 6 microns in size may be separated with decreasing effectiveness, with some variation in efficiency depending on the actual flow. Efficiencies are based on the separation of particles having densities in the range 60 to 350 lbs./ft.³.

The gas capacity of an individual helical channel is the gas flow rate range within which the acceptable separation effectiveness can be achieved. Since the radius of curvature of the gas stream is a fixed dimension, the only other variable of consequence is the rotational velocity of the gas, which is directly proportional to gas flow rate.

The allowable gas flow rate for a helical channel has an upper limit above which re-entrainment of separated material will occur. The lower gas flow rate limit is the point below which the centrifugal force is inadequate to separate particles of the size normally expected to be present in the gas.

Helical Channel Liquid and Solids Capacity

The helical separator embodiments of the present invention may handle low to heavy quantities of either solids or liquids (including slug flow), or combinations of solids and liquids. In a typical configuration as discussed herein, each helical separator 400 (e.g., FIGS. 1 and 2) may operate effectively at flow rates of up to 10 gallons per minute at 10 ACFM or 5 gallons per minute at 109 ACFM. These capacities apply for free-flowing liquids of a density in the range 40 to 70 pounds per cubic foot.

Solids may be effectively removed by the helical channels in quantities up to 337.5 grains per second (per channel) over the 10 to 109 ACFM range. These capacities apply for solids in a particle size range from 3 microns to 1,500 microns, and with densities from 60 to 350 pounds per cubic foot.

Helical Channel Pressure Drop

The pressure drop in individual helical channels is a function of the flow resistance coefficients of the helical channels and clean gas tube, and is proportional to the square of the gas velocity. The resistance coefficients of the helical channels and clean gas tube are characteristic of the design and are variables. The gas density, which is directly proportional in relation to the gas absolute pressure, becomes the primary determinant of the pressure drop through the helical channel of the helical separator embodiments of the present invention. The pressure drop may be calculated by the following equation:

$$\Delta P_{total} = \Delta P_{inlet} + \Delta P_{helicalcoil} + \Delta P_{outlet}$$

$$\Delta P_{inlet} = 0.78 \left( \frac{V_1}{4005} \right)^2 \times \left( \frac{P_{atm} + P_{design}}{P_{atm}} \right) \times \left( \frac{520}{460 + T_{design}} \right) \times SG \times Z \times \left( \frac{1}{27.7} \right)$$

$$\Delta P_{helicalcoil} = C \left( \frac{V_2}{4005} \right)^2 \times \left( \frac{P_{atm} + P_{design}}{P_{atm}} \right) \times \left( \frac{520}{460 + T_{design}} \right) \times SG \times Z \times \left( \frac{1}{27.7} \right)$$

$$\Delta P_{inlet} = 0.65 \left( \frac{V_3}{4005} \right)^2 \times \left( \frac{P_{atm} + P_{design}}{P_{atm}} \right) \times \left( \frac{520}{460 + T_{design}} \right) \times SG \times Z \times \left( \frac{1}{27.7} \right)$$

Where:
$\Delta P$=Pressure drop (psig)
$V_1$=ACFM$_{total}$/inlet nozzle area (ft.²)
$V_2$=ACFM$_{total}$/number of helical channels/helical channel area (ft.²)
$V_3$=ACFM$_{total}$/outlet nozzle area (ft.²)
C=Helical channel resistance coefficient
3.0 (0-3,000 fpm)
3.5 (3,001-5,000 fpm)
4.75 (5,001-7,000 fpm)
9.91 (7,001-10,000 fpm)
$P_{atm}$=Atmospheric pressure (psia)
$P_{design}$=Flowing pressure (psig)
$T_{design}$=Flowing temperature (° F.)
SG=Specific gravity
Z=Gas compressibility factor Exemplary Helical Separator Elements As noted above, one particular application for the particle collection and hydraulic removal system of the present invention is for removing particulate and liquids from a natural gas transmission pipeline. In such an application, and in various similar applications, the following flow conditions and solid/liquid densities might be expected:

| | |
|---|---|
| Flow volume | 0-218 ACFM |
| Flow densities | 0.04-10.0 lbs./cu. ft. |
| Solids density | 20-350 lbs/cu. ft. |
| Liquids density | 20-88 lbs./cu. ft. |

Under these flow conditions and at these solid/liquid densities, a typical configuration of separator 150, helical separator 400, and helical element 410 will be described in more detail. Referring to FIGS. 1-6, separator 150 may include an arrangement of 108 helical separators 400 which are tightly spaced and oriented vertically as depicted in FIG. 1.

For this example, helical element 410 is preferably about 4 inches in diameter and 5 inches high. Channels 460 and fins 470 preferably turn clockwise for an angular displacement of about 180 degrees along the height of helical element 410. Fins 470 are spaced apart about 0.5625 inch with a radius 465 of about 0.28125 inch. Chamfers 475 form an angle of about 45 degrees with respect to fins 470. With reference to the secondary vortex flow arrow in FIG. 6, each chamfer 475 on the upstream edge of fins 470 is about 0.125 inch in length and each chamfer 475 on the downstream edge is about 0.0625 inch in length. Thus, the total flow area formed by each helical element 410 is about 3.39264 square inches.

Outer tube 420 has an inside diameter of about 4.002 inches so that helical element 410 fits tightly within outer tube 420. Outer tube 420 is about 17.25 inches high and inner tube 430 is about 22 inches high. Inner tube 430 is positioned about 2 inches below the bottom of helical element 410 and is retained in place by four vertical fins 440, each about 2 inches high.

In this example, liquid may be injected at a typical rate of between 0.1 and 0.17 gallons per minute per helical separator 400, for a total of about 17.5 gallons per minute. As a result, at least 99.99 percent by weight of all liquids and particulate greater than about 0.3 micron may be separated and extracted.

As indicated above, the exemplary embodiment of helical separator 400 has been shown to effectively remove liquids at very low flow rates (less than 110 ACFM), or even no effective gas stream flow rate. With no effective gas stream flow, each helical separator has been shown to separate five gallons of liquid per minute. At typical gas stream flows, a single helical separator 400 has been shown to remove 10 gallons of liquid per minute.

Further, by way of example, the helical separator 400 has also been shown to remove liquids at a liquid-to-gas weight ratio of over 1,000%, whereas typical two-stage filter and vane separators remove only a 10% liquid-to-gas weight ratio.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A system for particle collection and hydraulic removal comprising:
   a separator vessel with a gas stream inlet, a gas stream outlet, and a waste liquid sump;
   a liquid injector between the gas stream inlet and gas stream outlet for injecting liquid into the gas stream and encapsulating particulate within the gas stream;
   a liquid separator between the liquid injector and the gas stream outlet for removing waste liquid and particulate encapsulated with the waste liquid;
   a waste liquid recovery tank hydraulically connected to the liquid sump for receiving waste liquid;

a side stream filter circuit with an inlet and outlet hydraulically connected to the waste liquid recovery tank, the side stream filter circuit including at least two filters; and a valve for selectively engaging one of the filters and isolating the other of the filters from the side stream filter circuit;

wherein the liquid separator includes a helical impingement separator comprising:

a generally cylindrical separator body forming an outer circumference;

a plurality of adjacent fins extending from the outer circumference and forming a plurality of primary helical channels;

a rounded radius formed in the separator body between adjacent fins;

an outer tube surrounding the separator body and adjacent to the distal ends of the fins, such that the separator body, fins, and an interior surface of the outer tube form a helical gas flow path; and a chamfer formed on the distal end of the fins, such that the chamfers and interior surface of the outer tube form a plurality of secondary helical channels.

2. The system of claim 1 further comprising a second liquid injector positioned to inject liquid within the liquid separator.

3. The system of claim 1 further comprising:

a lower end of the separator body forming a concave, generally conical surface; and a tube axially aligned and positioned within the outer tube, and axially spaced apart from the separator body for collecting liquid exiting the helical gas flow path.

4. The system of claim 1 wherein the helical impingement separator further comprises a second chamfer formed at the distal end of each fin, such that the second chamfers and interior surface of the outer tube form a plurality of secondary helical channels.

5. The system of claim 4 further comprising:

a lower end of the separator body forming a concave, generally conical surface; and a tube axially aligned and positioned within the outer tube, and axially spaced apart from the separator body for collecting liquid exiting the helical gas flow path.

6. A liquid impingement separator element for separating liquids from a gas stream, the separator element comprising:

an outer tube having an interior diameter;

a helical separator element positioned within and near the top of the outer tube, the helical separator element comprising:

a generally cylindrical body having a diameter and an outer circumference;

a plurality of adjacent separator fins extending from the outer circumference and forming a plurality of primary helical channels; and a chamfer on a distal edge of the fins, the chamfers positioned adjacent to the outer tube and forming a plurality of secondary helical channels;

wherein the primary and secondary helical channels form a gas flow path and facilitate impingement separation.

7. The liquid impingement separator element of claim 6 wherein the generally cylindrical body forms a generally rounded radius between adjacent fins.

8. The liquid impingement separator element of claim 6 wherein a lower end of the generally cylindrical body forms a concave, generally conical interior surface.

9. The liquid impingement separator element of claim 8 further comprising an inner tube axially aligned and positioned within the outer tube, and axially spaced apart from the generally cylindrical body by a distance of between one-fourth and three-fourths of the diameter of the generally cylindrical body.

10. The liquid impingement separator element of claim 6 further comprising:
   a generally rounded radius on the generally cylindrical body and positioned between adjacent fins;
   a lower end of the generally cylindrical body forming a concave, generally conical interior surface; and
   an inner tube axially aligned and positioned within the outer tube, and axially spaced apart from the generally cylindrical body by a distance of between one-fourth and three-fourths of the diameter of the generally cylindrical body.

11. A method for particle collection and hydraulic removal comprising:
   directing a gas stream into a separator vessel;
   injecting liquid into the gas stream for encapsulating particulate within the gas stream;
   directing the gas stream with injected liquid through a helical path to remove liquid and particulate encapsulated within the liquid, wherein the helical path forms a secondary helical channel, the secondary helical channel disrupting secondary vortices formed in the helical path;
   collecting liquid separated from the gas stream in a sump;
   transferring the liquid from the sump to a recovery tank hydraulically connected to the sump;

filtering the liquid from the recovery tank in a side stream filter circuit having an inlet and an outlet both hydraulically connected to the liquid recovery tank; and removing the liquid from the recovery tank and injecting the liquid into the gas stream.

12. The method of claim 11 further including the step of hydraulically isolating one of a plurality of filters in the side stream filter circuit, such that the isolated filter may be cleaned or replaced.

13. The method of claim 11 wherein the helical path forms a helical axis with a radius, and further includes a radially proximate rounded portion and a radially distal chamfered portion, such that the radially distal chamfered portion forms the secondary helical channel.

14. The method of claim 13 wherein the helical path includes an exit angled radially inward from the helical axis, and further including the step of collecting the liquid in a tube spaced apart from the exit and having a radius smaller than the radius of the helical path.

15. The method of claim 14 further including the step of hydraulically isolating one of a plurality of filters in the side stream filter circuit, such that the isolated filter may be cleaned or replaced.

16. A method for particle collection and hydraulic removal comprising:

directing a gas stream into a separator vessel;

injecting liquid into the gas stream for encapsulating particulate within the gas stream;

directing the gas stream with injected liquid through a liquid separator to remove liquid and particulate encapsulated within the liquid;

collecting liquid separated from the gas stream in a sump;

transferring the liquid from the sump to a recovery tank hydraulically connected to the sump;

filtering the liquid from the recovery tank in a side stream filter circuit having an inlet and an outlet both hydraulically connected to the liquid recovery tank;

circulating fluid in the side stream filter circuit at a rate greater than a rate of fluid transferred from the sump to the waste liquid recovery tank; and removing the liquid from the recovery tank and injecting the liquid into the gas stream.

17. The method of claim 16 wherein the gas stream with injected fluid is directed through a helical path in the liquid separator.

18. A liquid impingement separator element for separating liquids from a gas stream, the separator element comprising:

an outer tube having an interior diameter;

a helical separator element positioned within the outer tube, the helical separator element comprising:

a generally cylindrical body having an outer circumference;

a plurality of adjacent separator fins extending from the outer circumference and forming a plurality of primary helical channels; and a generally rounded radius formed in the cylindrical body between adjacent fins;

wherein the primary helical channels and the interior diameter of the outer tube form a plurality of helical gas flow paths.

19. The liquid impingement separator element of claim 18 further including a chamfer on a distal edge of the fins, the chamfers positioned adjacent to the outer tube and forming a plurality of secondary helical channels.

20. The liquid impingement separator element of claim 18 further including two chamfers formed on distal edges of each fin, the chamfers positioned adjacent to the outer tube and forming a plurality of secondary helical channels.

21. The method of claim 16 further including the step of hydraulically isolating one of a plurality of filters in the side stream filter circuit, such that the isolated filter may be cleaned or replaced.

* * * * *